United States Patent Office 2,867,084
Patented Jan. 6, 1959

2,867,084

FUEL FEED AND POWER CONTROL SYSTEM FOR GAS TURBINE ENGINES HAVING AN ENGINE TEMPERATURE CONTROL

Daryl L. Criswell, South Bend, Ind., assignor to Bendix Aviation Corporation, South Bend, Ind., a corporation of Delaware Application March 22, 1954, Serial No. 417,803

9 Claims. (Cl. 60—39.28)

This invention is an improvement of the system disclosed and claimed in the copending U. S. application of Harry C. Zeisloft, Serial No. 410,121, filed February 15, 1954 (common assignee), and relates to a fuel feed and power control system for gas turbine engines and more particularly to such a system utilizing a proportional type by-pass fuel control unit which is referenced to and operable as a function of one or more engine temperature schedules.

In the copending application of Harry C. Zeisloft, Serial No. 248,402, filed September 26, 1951 (common assignee), now abandoned in view of continuation application No. 684,368, filed September 16, 1957, there is disclosed a fuel scheduling type control for turbo-prop and turbo-jet engines with which a pilot is free to accelerate to a selected power setting and the quantity or weight of fuel supplied to the burners is automatically regulated to permit maximum allowable rate of acceleration within a safe turbine temperature limit and to avoid compressor surge or stall; also, for a propeller type engine, during part throttle operation the fuel is automatically supplied at a rate which will give optimum stability for the torque absorption characteristics of the propeller. This fuel control generally comprises an engine speed governor which is adapted to control the area of a variable fuel metering orifice across which a fixed metering head is maintained. Superimposed on the governing action are scheduled limitations on fuel flow which provide turbine temperature and compressor surge protection during engine acceleration, deceleration fuel flow limitation, and controlled fuel flows for part load engine operation. All of these scheduled limitations of fuel flow, with the exception of the deceleration flow schedule, are functions of a temperature corrected three-dimensional cam system which controls the area of the metering orifice as a function of various engine operating conditions. Also included within the control is coordinating means for obtaining desired steady state operating conditions as a function of fuel control governor and part load fuel control settings, both properly coordinated with propeller governor settings.

The scheduling type of fuel control for engines of the type specified may be accurately calibrated to exactly meet the desired engine fuel flow schedules for engine acceleration, deceleration, or steady state operation, under any and all conditions of ambient pressure and/or temperature. The aforesaid type of engine fuel control is, however, inherently limited with respect to its versatility of automatic adaptation to engines having somewhat different optimum fuel flow demands than those for which the control was calibrated to meet, to engines which may utilize different fuels of varying specific gravity and viscosity, and to variations in fuel controls of the same model as a result of manufacturing tolerances and the like. For example, variations in the optimum acceleration schedule of fuel flow for any given engine may occur as a result of changes in combustion efficiency, compressor deterioration, and variations in the type of fuel used, whereas additional variations in said schedule for different engines of the same model may occur as a result of engine to engine and/or control to control variations due to manufacturing tolerances and the like. It is therefore apparent that an accurately calibrated control will not necessarily meet optimum engine fuel requirements throughout the life of a given engine, nor will it or another control of the same model necessarily meet optimum fuel requirements of different engines of the same model.

To circumvent the difficulties inherent in tailoring a control unit for each individual engine, and to eliminate the necessity of resetting the fuel schedule of any given control as engine hours of use and/or fuel type varies, we provide a put-and-take type proportional by-pass fuel control, hereinafter described in detail, in series with the main fuel control unit and operable in conjunction with a turbine temperature sensing electronic temperature and amplifier control means. With this arrangement the main fuel control is calibrated to schedule fuel flow to the engine at a predetermined percent rich over that flow required for optimum engine performance under all conditions of engine operation, the put-and-take proportional by-pass control being operable at all times to by-pass that percentage of total fuel flow necessary to maintain an optimum turbine temperature and to avoid the phenomenon known as compressor surge or stall during acceleration irrespective of engine and/or fuel control and/or fuel variations. The electronic temperature control and amplifier at all times senses actual turbine inlet temperature and compares said temperature, which is indicated as a voltage, with a reference voltage, which is indicative of desired turbine temperature at any given condition of engine operation, the difference between said voltages being indicative of a temperature error which is transmitted as a signal to the by-pass control to decrease or increase the percent by-pass flow as necessary to maintain some desired schedule of turbine temperature. The reference temperature or voltage is always a function of pilot's lever position and engine speed and may be relayed to the temperature control and amplifier through an arrangement of potentiometers, hereinafter described.

It is therefore one of the primary objects of this invention to provide in a fuel system for engines of the type specified a by-pass type fuel control device operable as a function of a reference temperature, and means for varying the reference temperature as a function of engine speed and ambient or compressor inlet temperature during an acceleration of the engine in such a manner that the by-pass control will automatically control fuel flow to maintain a predetermined optimum engine temperature schedule while avoiding compressor stall or surge.

An important object of this invention is to provide a by-pass type fuel control adapted for use in engine fuel systems for regulating the percentage of by-pass flow in such a system during acceleration of the engine as a function of an engine operating parameter.

A further object of this invention is to provide in a fuel system for gas turbine engines, a put-and-take type by-pass fuel control adapted to by-pass a variable percentage of the total metered fuel flowing to the engine for the purpose of maintaining a predetermined schedule of turbine temperature for all conditions of engine operation.

A further object of this invention is to provide in a fuel system for gas turbine engines a proportional bypass put-and-take fuel control which varies its percentage of put or take of fuel to or from the engine burners during acceleration of the engine as a function of a scheduled temperature parameter.

Another object of this invention is to provide a fuel system for gas turbine engines a main fuel control and a by-pass temperature datum control operable conjointly in such a manner that substantially optimum engine performance is realized under all engine operating conditions irrespective of variations from a desired optimum fuel schedule resulting from such things as engine to engine or control to control variations due to manufacturing tolerances, variations in combustion efficiency, changes in fuel type, or compressor deterioration.

The foregoing and other objects and advantages will become apparent in view of the following description taken in conjunction with the drawings, wherein.

Figure 1:
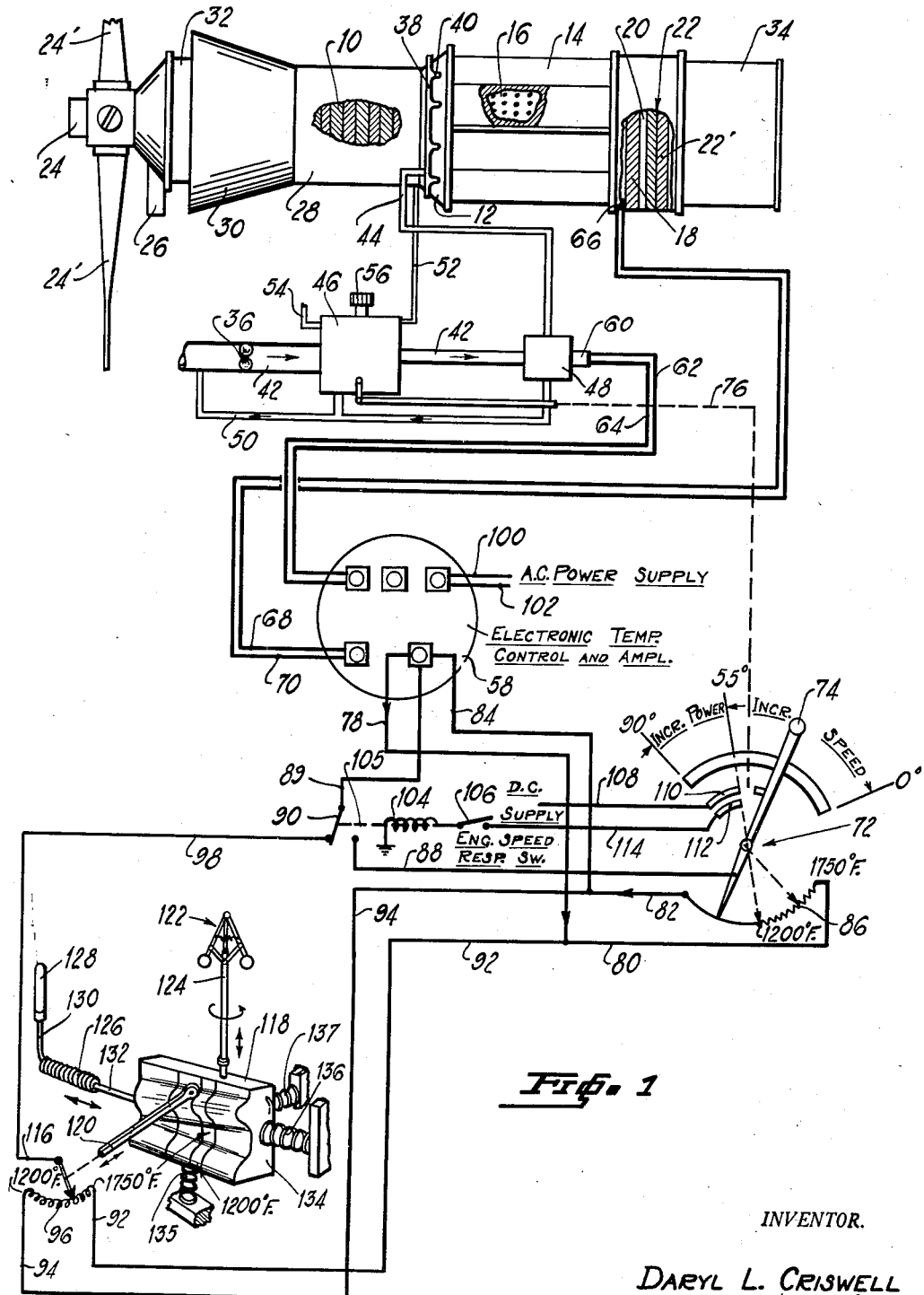
Figure 1 is a diagrammatic view of a turbo-prop engine having operatively associated therewith a functional schematic of a fuel control system which embodies the feature of the instant invention.

Referring now to Figure 1, the gas turbine engine in general comprises a compressor 10 which is adapted to force air into an annular header 12 arranged so as to direct the air to a plurality of annularly spaced combustion chambers 14, each of which contains a burner or generator 16 having air inlet holes in the walls thereof through which at least part of the air is fed for admixture with fuel to produce combustion. The burners 16 discharge into a collector ring 18 which is arranged to direct the air and products of combustion through a set of stationary distributing blades 20 against the blades 22' of a turbine rotor 22. The turbine 22 drives the air compressor 10 and these components may be mounted on a common shaft, not shown, or may be drivingly coupled through transmission mechanism. The turbine in addition to driving the compressor, is adapted to drive a propeller 24 which is provided with variable pitch propeller blades 24'. The pitch changing mechanism may be of any suitable type, and since variable pitch propellers are well known and may be purchased as a complete unit in the open market the pitch changing mechanism is not shown in detail; it includes a propeller governor 26 which may be either of the constant or variable speed type depending on the nature of the most desirable engine operating curve in the power range of engine operation, and which is hereinafter described as a constant speed propeller pitch governor so that the engine operates at a fixed maxium operating speed throughout the range of power operation. The compressor 10 is mounted in a casing or housing 28 forwardly of which is a flared intake or cowling 30 which opens in the direction of aircraft travel. The part indicated at 32 houses the reduction gearing between the turbine and propeller drive. As will be understood, the major part of the available energy resulting from the combustion and expansion of the compressed mixture of air and fuel is utilized in driving the turbine, compressor, and the propeller, whereas the remainder is utilized as jet thrust in a tail cone and exhaust jet nozzle, not shown, housed in the tail piece 34.

Figure 2:
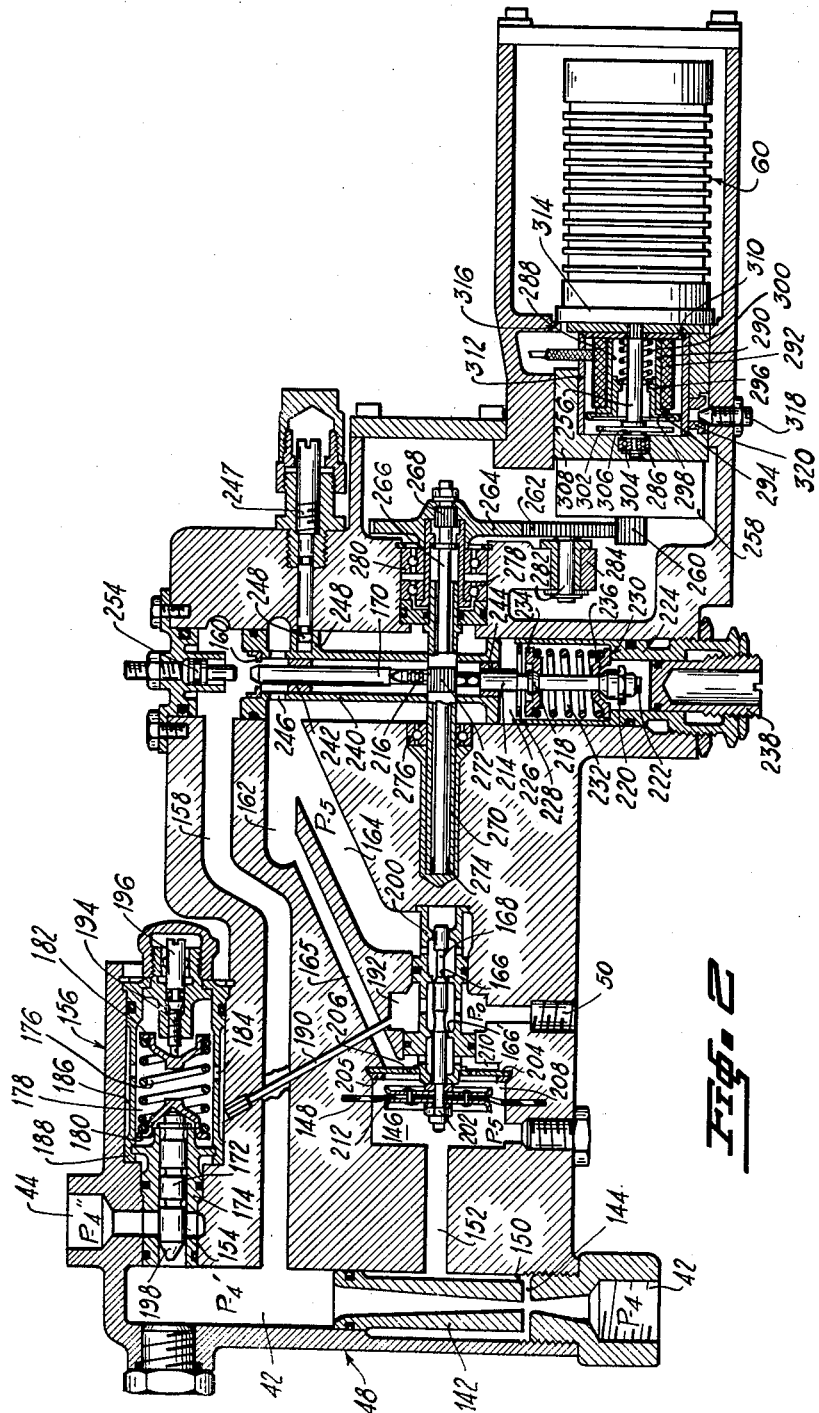
Figure 2 is a sectional schematic view of the proportional by-pass flow control which is diagrammatically shown in the fuel system of Figure 1.

The present invention is concerned with the fuel system and coacting controls therefor, shown more or less diagrammatically in operative relation with the gas turbine engine in Figure 1, and is more particularly concerned with the proportional by-pass control unit and engine acceleration temperature control means therefor, shown in Figures 1 and 2. A fuel pump 36 pressurizes fuel from a reservoir, not shown, to a fuel manifold 38, which is connected by a plurality of conduits 40 to burner nozzles, not shown, in the various combustion chambers 14, through main fuel conduits 42 and 44, a main fuel control device 46, and a proportional by-pass control device 48. A by-pass conduit 50 connects the main and by-pass fuel controls 46 and 48 with the low pressure side of pump 36. The main fuel control device 46 is preferably of the type disclosed and claimed in the copending application of Harry C. Zeisloft, Serial No. 248,402, supra, hereinbefore described in general terms, and controls the flow of fuel to control 48 as some function of compressor discharge pressure, compressor inlet temperature and engine speed and is adapted to be sensibly connected to these engine operating parameters through a conduit 52, a conduit 54, and a splined drive member 56, respectively.

The proportional by-pass control device 48, as utilized in this fuel system, operates as a temperature datum control device and is adapted to by-pass the necessary percentage of the fuel flowing from main control 46 to maintain a desired schedule of turbine inlet or outlet temperatures under various conditions of engine operation. The by-pass control 48 is in turn effectively controlled by an electronic temperature control and amplifier unit 58 which is connected to a motor actuator unit 60 of control 48 by lead lines 62 and 64 and which is adapted to electrically compare an actual engine operating temperature with a reference or desired temperature, which latter temperature may vary with engine speed, compressor inlet temperature and/or pilot's control lever position, the difference between said actual and reference temperatures being measured as an error voltage within the temperature control section of the electronic unit 58 and amplified and transmitted to the motor actuator 60 to control the by-passing function of control 48 so that the actual sensed temperature is maintained equal to the reference temperature during various conditions of engine operation. Electronic unit 58 actually responds to voltages which are proportional to the aforementioned temperatures, which voltages may be hereinafter referred to as temperatures. The electronic temperature control and amplifier unit 58 may be of the type which is disclosed in the copending application of Billy S. Hegg and Norman K. Peters, Serial No. 454,348, filed September 7, 1954 (common assignee), which application is a continuation of now abandoned application Serial No. 212,566 filed February 24, 1951.

A suitable type thermocouple 66 is shown in the inlet section to the turbine 22 and produces, in a well known manner, a voltage which is proportional to the temperature in the turbine inlet area, the electronic unit being connected thereto through lines 68 and 70. A pilot's control quadrant 72 includes a control lever 74 which is adapted to control the setting of main fuel control 46 through a lever 76 and which is operatively connected to the electronic unit 58 through one or another of two parallel electrical circuits, one of which comprises lead lines 78, 80, 82 and 84, a potentiometer 86 in circuit line 82, and a reference voltage or temperature line 88, 89 of potentiometer 86 which may be broken out of circuit by a switch 90, and the other of which circuits comprises lead lines 78, 92, 94 and 84, a potentiometer 96 in lines 92, 94 and a reference voltage or temperature line 98, 89 of potentiometer 96 which may also be broken out of circuit by the switch 90.

The electronic unit 58 receives its electrical power supply from an A. C. generator, not shown, and lead lines 100 and 102. The A. C. supply is rectified, filtered and regulated within the temperature control section of unit 58 which then supplies the potentiometer circuits just described with a precisely regulated direct current. The position of switch 90 is controlled by a relay 104 which is ganged to said switch by a member 105 and which is energized from a D. C. supply source, not shown, whenever an engine speed switch 106 is closed and pilot's lever 74 is positioned between 55° and 90° of quadrant angle, in which instance said lever closes a circuit between the D. C. supply and relay 104 through line 108, bus bars 110 and 112, line 114 and speed switch 106. The engine speed switch 106 is responsive to engine speed through mechanism not shown, and closes the circuit only after a predetermined engine operating speed has been attained. Whenever the relay 104 is energized, switch 90 is actuated in a counterclockwise direction to close the temperature reference circuit between potentiometer 86 and unit 58 through lead lines 88 and 89, whereas de-energization of said relay positions said switch as shown to complete a temperature reference circuit between potentiometer 96 and unit 58 through lead lines 98 and 89.

The pointer of potentiometer 96 is pivoted at 116 and is positioned on the resistance of the potentiometer as a function of the rise of a three dimensional type cam 118, which cam rise varies as a function of engine speed and compressor inlet temperature, said pointer being operatively connected to said cam by a follower 120. An engine speed sensing device 122, shown as a fly-ball type, abuts an edge of the cam 118 on a slider 124 and determines the effective transverse position of said cam with respect to follower 120 as a function of existing speed, whereas a liquid filled bellows 126 is connected to a temperature probe 128 through a conduit 130 and is connected to the cam 118 by a member 132 which is slidable on a second edge of said cam. Springs 135, 136 and 137 maintain the edges of cam 118 against slider 124, member 132 and follower 120, respectively, at all times. The temperature probe 128 is preferably positioned in the inlet section of compressor so that the length of bellows 126 will vary directly as a function of compressor inlet temperature, thereby axially positioning cam 118 as a function of said temperature through member 132. The cam 118 has a surface 134 which is contoured in three dimensions in such a manner that any given position thereof during an engine acceleration, as determined by engine speed and compressor inlet temperature, references electronic unit 58 to an ideal or optimum turbine inlet temperature through potentiometer 96 to meet the particular requirements of any given engine.

During an engine acceleration at any given compressor inlet temperature, cam 118 is actuated in a transverse direction toward speed sensor 122; whenever follower 120 abuts the flat portions of the contoured surface 134 which corresponds to an assumed maximum allowable value of 1750° F. turbine inlet temperature, the pointer of potentiometer 96 signals a reference voltage or temperature of 1750° F. to unit 58, whereas traverse by follower 120 across the low speed cam rise portion results in actuation of the pointer toward the illustrated 1200° F. side of potentiometer 96 as follower 120 moves toward the crest of said cam rise and back toward the 1750° F. position as the cam follower moves away from said crest. The said cam rise portion, which varies considerably in contour with changes in compressor inlet temperature, is designed to meet the ideal turbine temperature schedule, as reflected in the temperature to which unit 58 is referenced, across the engine speed ranges wherein the condition of compressor surge or stall may be encountered to insure a maximum allowable rate of acceleration while avoiding the undesirable condition of compressor surge or stall. In other words, since optimum acceleration fuel requirements for engines of the type specified, which are subject to the condition known as compressor surge or stall, varies as some function of engine speed and inlet temperature, the cam 118 is positioned in one dimension as a function of engine speed, in a second dimension as a function of inlet temperature, and a third dimension comprises a predetermined cam contour which relates the speed and temperature parameters to the functions thereof which define optimum fuel or turbine temperature requirements for a given engine. Obviously the surface 134 of cam 118 may be contoured as desired to meet the particular optimum requirements for any given engine. The cam rise portion at the high speed end of cam 118 is contoured so that with continued increasing speed cam follower 120 actuates the pointer of potentiometer 96 to the 1200° F. position thereof when said follower is at the crest of said cam rise portion, thus defining a part throttle curve which reduces fuel flow from the acceleration curve at 1750° C. to the operational idle point of the engine at 1200° F. (see Figure 3).

Between 0° and 55° of pilot's control lever 74 setting switch 90 remains in the position shown thereby placing potentiometer 96 in the temperature control reference circuit, whereby the reference voltage or temperature signaled to unit 58 is controlled as described for an engine acceleration. Cam 118 and potentiometer 96 together control said reference temperature until such time as pilot's lever 74 is actuated to a position between 55° and 90° of quadrant angle and the engine attains a predetermined maximum operating speed which results in closure of speed switch 106; the coincidence of these two events results in energization of relay 104 and actuation of switch 90 to place potentiometer 86 in the temperature control reference circuit. The temperature reference in the power range of engine operation is therefore a function of pilot's lever position only since the pointer of potentiometer 86 is positioned on the resistance thereof as a function of pilot's lever position to define a reference temperature schedule throughout the steady state regime schedule of the engine. During operation on said regime schedule the propeller pitch governor 26, in the system as illustrated, is effective to maintain a constant maximum operating engine speed by increasing the pitch of propeller 24 as necessary to maintain said speed irrespective of changes in the level of power which may be demanded by the pilot. The mode of operation, above set forth in general terms, will be more fully discussed hereinafter.

Referring now to Figure 2, a detailed showing of the proportional by-pass control device 48 is shown connected to the main control discharge conduit 42, burner nozzle conduit 44, by-pass conduit 50 and motor 60. A venturi 142 in passage 42 has a transverse passage 144 at the throat thereof which is connected to a static pressure chamber 146, formed on one side of a diaphragm member 148, through an annular chamber 150 and a passage 152. The passage 42 is connected with conduit 44 through an orifice 154 which is controlled by a fuel pressurizing valve unit 156, and to conduit 50 through a branch passage 158, a restriction 160, a chamber 162, parallel passages 164 and 165, and restrictions 166 and 166′ which are controlled by a hydraulically balanced by-pass valve 168. The area of restriction 160 is controlled by a contoured by-pass or put-and-take temperature datum valve 170 which is controlled by mechanism to be described.

The pressurizing valve unit 156 functions to insure a predetermined minimum pressure $P_4'$ in conduit 42 before fuel can flow to the burner nozzles through conduit 44 and generally comprises a reciprocable valve member 172 mounted in a sleeve 174 and urged in a closing direction by a spring 176 which is contained within a chamber 178 and abuts spring retainers 180 and 182 at either end thereof, said chamber 178 being at all times in communication with the by-pass conduit 50 through openings 184, an annular chamber 186, a passage 190 and a chamber 192. An adjustment screw member 194 may be axially actuated to adjust the preloading of spring 176 by a slotted extension 196 thereof. When fluid first begins to flow into control 48 the pressurizing valve 172 remains in a closed position until such time as pressure $P_4'$, which acts on the face 198 of valve 172, overcomes the spring 176 and actuates said valve in an opening direction.

The by-pass valve 168 is reciprocably mounted in a sleeve 200 and is fixed at the one end thereof to the diaphragm 148 by a threaded stem and nut assembly 202; a retainer plate 204 containing openings 206 which connects a chamber 208 with chamber 162 through a passage 210 and a chamber 212 is held in fixed position by a lock ring 205 and holds sleve 200 in position. Recessed diaphragm strengthening members 212 are suitably attached to the diaphragm and to the valve 168. Any fluid which flows through restriction 160 and the chamber 162 divides and flows through parallel passages 164 and 165 and thence through by-pass valve restrictions 166 and 166' to by-pass conduit 50. The diaphragm 148 is not spring loaded and will therefore control the position of valve 168 in such a manner that the pressures in chambers 146 and 208 are always equal to each other and to the pressure in passage 144 in the throat of venturi 142.

As is well known, the square root of the static pressure recovery through a venturi is proportional to the flow of fluid therethrough. With our arrangement this pressure differential is imposed across the proportional by-pass control valve 170 at all times, whereby for any fixed position of valve 170 a constant percentage of the flow of fluid through venturi 142 will by by-passed through restriction 160 irrespective of variations in total flow. The percentage of fluid by-passed will therefore vary only as a function of the area controlling position of valve 170, which position is a function of the error voltage (temperature) output, if any, of electronic unit 58.

Whenever actual turbine inlet temperature, as sensed by thermocouple 66, is equal to the desired reference temperature, as controlled by engine speed and pilot's control lever position (see Figure 1), the motor 60 is in a neutral position and the valve 170 assumes its normal or null position, as shown in Figure 2, in which position a predetermined constant percentage of the flow through venturi 142 is by-passed through restriction 160, as previously explained, irrespective of changes in engine operating conditions.

The valve 170 includes an extension member 214 which in turn includes a rack portion 216, a flange 218 and an abutment piece and nut 220 receivable on a threaded end 222 of the valve extension. A partially threaded sleeve member 224 is contained within a chamber 226 and may be externally adjusted in an axial direction with relation to the null position of valve 170 and extension 214 thereof. A lock ring 228 and a stepped portion 230 of sleeve 224 serve as preload abutment means for a spring 232 which is mounted on retainers 234 and 236. A maximum take stop 238 is threaded into the hollowed end of sleeve member 224 and is adjustable to limit the maximum percentage of fuel which the valve 170 may by-pass or take from main fuel conduit 42. The valve 170 is reciprocable within a hollow I-shaped sleeve member 240 which contains valve bearing inserts 242 and 244, restriction 160, and openings 246. A threaded adjustment member 247 having an eccentric 248 at its one end which is contained within a channel shaped transverse extension 249 of sleeve 240, is rotatable to axially adjust the position of sleeve 240, restriction 160, and therefore the effective null position of valve 170. A threaded adjustable minimum by-pass or maximum put stop 254 limits the minimum flow position to which the valve 170 can travel, and thereby limits the minimum percentage of total flow which may be by-passed. The null position of the valve 170 may be adjusted either by adjustment of restriction 160, as above explained, or by adjustment of the valve 170 by means of the adjustment sleeve 224.

Whenever valve 170 is in its null position the preload in spring 232 maintains retainers 234 and 236 in abutment with lock ring 228 and sleeve step 230, respectively. If, during operation, valve 170 is actuated toward its put or take stop by motor 60 as a result of an under or over temperature condition at the turbine inlet, abutment 220 or 218 respectively, will seat on its adjacent spring retainer, thereby actuating the retainer and spring away from the maximum take stop if the needle is moving in a put direction and away from the maximum put stop if the needle is moving in a take direction.

The motor 60 is a 400 cycle, 2 phase, reversible type servo motor-generator combination such as is shown in the copending application of Hegg and Peters, supra, and is connected to the rack 216 of valve 170 through a rotatable step-down shaft 256, a gear train contained within housing 258, a spline 260, an idler gear 262, a valve drive gear 264, and a torsion bar 266 which meshes with gear 264 at an internally splined section 268 and which passes through a hollow cylindrical sleeve member 270 having a gear 272 thereon which is arranged to mesh with rack 216, said torsion bar 266 being rigidly connected, as by brazing, to sleeve 270 at section 274. In practice, a gear ratio of 1000:1 is used between motor 60 and valve 170 which results in a maximum required motor torque of 0.6 inch-ounces. The sleeve, torsion bar and gear assembly 270, 266 and 264 are supported in the housing of control 48 by bearing 276, 278 and 280, and the idler gear 262 has a shaft 282 which may rotate in a bearing 284. The step-down motor shaft 256 is supported between the gear train and motor housings by a bearing 286 and is rotatable in a chamber 288 formed by a solenoid core 290 on which is wound a coil 292, which together with an axially movable ring-shaped brake shoe 294, an armature and spring retainer 296 to which the said brake shoe is fixedly connected at 298 and which is urged leftwardly or in a braking direction by a spring 300, and a rotatable friction disc 302 axially fixed on shaft 256 between shoulders 304 and 306 thereon, comprises a solenoid controlled motor braking device 308. The motor-brake 308 is maintained in position as shown by an annular shoulder 310 on core 290 held in an annular groove of a brake housing insert member 312. The sub-assembly of the motor 60, brake 308, and gear train 258 is adjusted to desired position within the housing of by-pass control 48 by bringing into abutting relation a motor housing flange and control housing shoulder 314 and 316 respectively, and by tightening a tapered alignment screw 318 into an opening of an alignment element 320.

The solenoid of the motor brake 308 is normally energized by maintaining a pilot control switch, not shown, in closed position, in which instance the armature 296 is held in the position shown by the solenoid force thereby maintaining friction disc 302 and the brake shoe 294 out of contact, as shown. Whenever the pilot desires to fix the position of valve 170 irrespective of changes in turbine inlet temperature, as for example during an aircraft landing operation, the solenoid is de-energized and spring 300 actuates brake shoe 294 into braking relation with rotating disc 302 thereby eliminating the possibility of rotation of shaft 256 and consequent actuation of valve 170. If, during operation of the engine control system shown in Figure 1, a very substantial turbine inlet temperature error exists for some reason, motor 60 might drive valve 170 against its maximum put or take stop depending on the direction of the temperature error, in which instance the torsion bar 266 would be driven in a twisting direction through its geared connection to motor shaft 256 as necessary to absorb the motional inertia of the motor at the moment valve 170 contacted either of said stops, thereby avoiding possible damage to the gear train under the assumed condition of operation.

Figure 3:
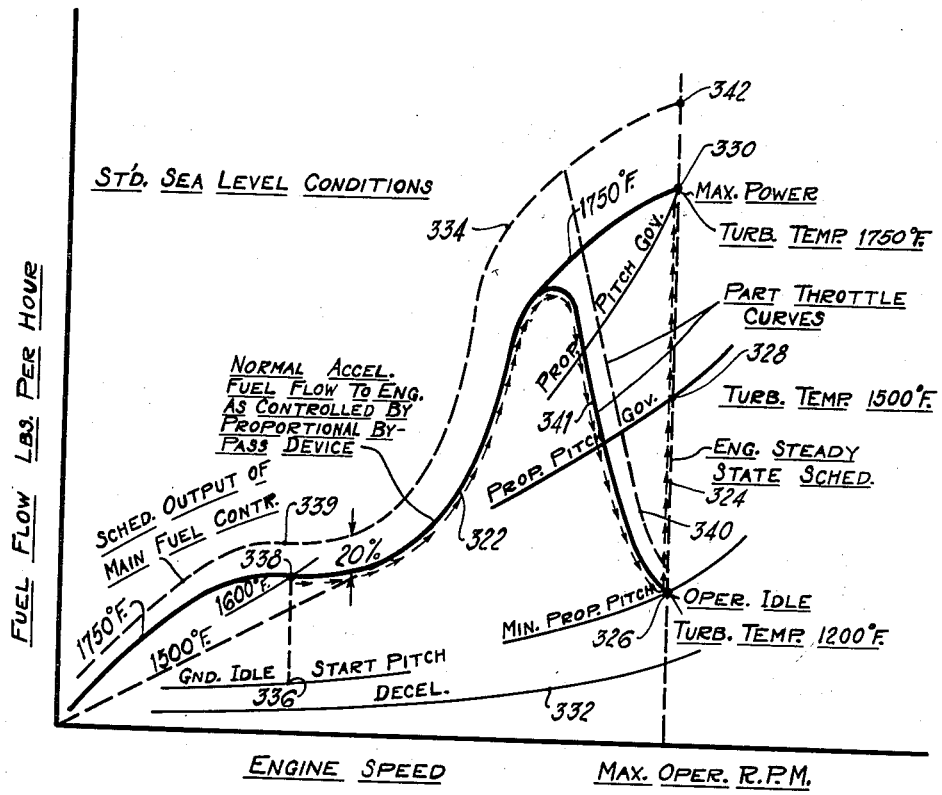
Figure 3 is a curve chart illustrating the operation of the fuel system shown in Figure 1.

Referring now to Figure 3, engine operating characteristics at standard sea level conditions are illustrated by an acceleration curve 322, an engine power regime schedule 324 having illustrated points of steady state engine operation at 326, 328 and 330, which points are determined by the intersection of propeller pitch governor lines and the fuel flow schedule line 324, as illustrated, and an engine deceleration curve 332, all plotted on the coordinates of fuel flow in pounds per hour versus engine R. P. M. Broken curve 334 illustrates the scheduled output of the main fuel control during acceleration as stated conditions, which scheduled output is always, for example, 20 percent above acceleration curve 322 when the valve 170 of by-pass control 48 is in its null position; i. e. when no temperature error exists as between actual turbine inlet temperature and reference temperature and control 48 is by-passing 20 percent of the output of main control 46. A condition of ground idle operation is illustrated at point 336 on the start pitch curve. Exemplary turbine inlet temperature values are indicated on acceleration curve 322 and for each of the steady state points of operation 326, 328 and 330 on curve 324; points corresponding to the indicated temperature values on said curves are illustrated on accelerator cam 118 and on steady state temperature reference potentiometer 86. Obviously, all of the specifically noted values which appear on Figures 1 and 3 are merely illustrative and may be varied as desired to meet different engine requirements by proper calibration and design of the control system.

Operation

Assume that the turbo-prop engine shown in Figure 1, has been started and accelerated to operate at the ground idle point 336 on the minimum propeller pitch curve. In this condition of operation the various elements in the complete control system would be substantially as shown in Figure 1; i. e. the propeller governor 26 is against its minimum pitch stop at ground idle speed, the main fuel control 46 has been set by the position of pilot's lever 74 through control linkage 76 to govern the engine at ground idle speed, and the acceleration potentiometer 96 controls the reference voltage or temperature signal to unit 58, which reference temperature is indicated by the position of follower 120 on cam 118 as being 1600° F. The electronic unit 58 and the by-pass control unit 48 are therefore referenced to a point on the acceleration curve as standard sea level conditions and at ground idle speed, as indicated by point 338 in Figure 3. Inasmuch as the main fuel control 46 controls engine speed and fuel flow at ground idle operation, the temperature error sensed by unit 58, which results from the difference between the relatively low actual turbine inlet temperature existent at ground idle point 336 and the temperature to which unit 58 is referenced at point 338, causes motor 60 to drive valve 170 of the by-pass control unit 48 against its maximum put-stop 254; this action, however, will be effectively overriden by the operation of the main fuel control 46 and the engine will remain at ground idle speed and fuel flow until such time as the pilot advances control lever 74.

If the pilot should now advance lever 74 to, say, 55° of throttle lever angle, the condition of engine operation as illustrated by operational idle point 326 is demanded. Such an advance of the pilot's lever 74 results in a substantially simultaneous occurrence of the following events: lever 76 is actuated to reset main fuel control 46 so that it will control engine speed only if an over speed condition is attained, so that fuel flow is instantly increased to a point 339 on curve 334, so that the main control schedules a fuel flow during engine acceleration, such as is illustrated by the broken curve 334, and so that a part throttle curve is scheduled, such as is illustrated by broken line 340; the pointer of potentiometer 86 is set at the 1200° F. reference point but is not effective to control the temperature reference until engine speed switch 106 closes at maximum operating R. P. M.; and the pointer of potentiometer 96 momentarily remains in the position shown at ground idle speed thereby effectively referencing electronic unit 58 to the 1600° F. turbine temperature at point 338 which results in actuation of valve 170 from its maximum put-stop position to its null position, as shown in Figure 2, as main control 46 increases fuel flow to point 339 and control 48 by-passes the normal 20 percent of total flow. These operating events result in an increase in fuel flow to the engine from point 336 to point 338 on acceleration curve 322.

If the main control 46 is properly functioning and has been tailored to schedule the desired flow of a certain fuel type to the particular engine involved, fuel will be scheduled along the broken line 334 during acceleration at standard sea level conditions, in which instance no turbine temperature error would exist and valve 170 would remain in the illustrated null position at which a constant 20 percent of the scheduled output of the main control is by-passed and the optimum acceleration curve 322 is met.

During such an acceleration the engine speed sensing device 122 actuates slider 124 away from cam 118 but spring 135 maintains continuous contact between the cam edge and the slider, thereby moving cam follower 120 along an acceleration contour which is a function of speed and compressor inlet temperature, as hereinbefore described, so that the reference voltage or temperature output of potentiometer 96 schedules, through the operation of units 58 and 48, a predetermined and desired acceleration temperature regime irrespective of changes in engine operating conditions. For example, with decreases in compressor inlet temperature the dip portion of curve 322 which skirts the surge characteristic of the compressor, shifts downwardly and to the left, decreases the R. P. M. range bridged by the compressor surge dip, and dips to a lower value of turbine inlet temperature. These complex functions of variation in the compressor surge characteristic with variations in compressor inlet temperature across a given engine speed range, are taken into account by the contour of surface 134, as shown. The cam rise portion in the high speed range is contoured to produce a temperature reference schedule such as is illustrated by part throttle curve 341, thereby decreasing fuel flow from acceleration curve 322 to operational idle point 326 (1200° F.). The main fuel control 46 normally schedules a part throttle curve 340 which is 20 percent rich over curve 341.

At operational idle propeller governor 26 holds minimum pitch to govern engine speed and the speed switch 106 closes to energize relay 104 and actuate switch 90 rightwardly, thereby shifting the temperature reference circuit from potentiometer 96 to potentiometer 86. At the operational idle position of pilot's lever 74, potentiometer 86 references electronic unit 58 to 1200° F. turbine inlet temperature, as shown, and valve 170 is actuated by motor 60 in a put or take direction as necessary to correct any error which may exist in the scheduled output of the main control so that a turbine temperature of 1200° F. is maintained.

If the pilot now actuates lever 74 to maximum power position at 90° throttle angle the following events occur substantially simultaneously: main fuel control 46 is set through lever 76 to increase fuel flow to a point 342 on curve 334; propeller pitch governor 26 functions to increase propeller pitch immediately following each increment of increased fuel flow along curve 324 to maintain a substantially constant maximum operating R. P. M.; and potentiometer 86 signals a reference voltage or temperature of 1750° F. to unit 58, which corresponds to the desired operating temperature at maximum power point 330, thereby instantaneously resulting in a very large under temperature error as indicated by the difference between the reference temperature at point 330 and the momentarily existent turbine temperature at point 326, which causes actuation of valve 170 toward its maximum put-stop 254. As engine power increases along arrowed line 324 and approaches point 330, actual turbine temperature at thermocouple 66 approaches the reference temperature of 1750° F. and valve 170 is actuated toward the maximum take stop until it reaches its illustrated null position with the main control functioning to meter fuel to point 342.

If, during steady state operation at the maximum power point 330, the main control 46, for example, should, for any reason, function to increase flow above that illustrated at point 342 the electronic unit 58 would sense an over temperature error and actuate motor 60 in a direction to drive valve 170 toward the maximum take-stop 238 as far as necessary to return engine fuel flow to point 330, at which point the temperature error is zero. The new off-null position of valve 170 would be maintained unless and until a new condition occurred which caused a temperature error in either direction. The opposite mode of operation would occur should the main control 46 meter, at maximum power, a fuel flow less than that indicated at point 342. In the latter instance electronic unit 58 senses an undertemperature error which results in an actuation of valve 170 by motor 60 from its normal null 20 percent by-pass position, or from any other position which it may have assumed to correct a prior temperature error, toward maximum put-stop 254 as far as necessary to return the temperature error to zero. In a similar manner, turbine inlet temperature is controlled to a desired value at any other selected point of engine power operation, such as at point 328, along the power regime curve 324.

From the above it is apparent that a temperature error which might normally exist at any given point of operation on power curve 324 or along acceleration curve 322 as a result of possible malfunctioning of the main control 46, variations from one engine or one fuel control to another due to manufacturing tolerances or period of use, and/or variations in combustion efficiency or fuel type used, as hereinbefore discussed, would be automatically corrected as a result of the compensating action of the herein disclosed proportional by-pass control and the temperature datum system connected thereto.

Although only one form of the control system and proportional by-pass control unit, embodying the invention, has been schematically illustrated and described, it will be understood that many changes in the system controls may be made by those skilled in the art.

I claim:

1. In a fuel feed and power control system for a gas turbine engine, a fuel conduit connected to deliver fuel under pressure to the engine, first means for withdrawing a substantially constant percentage of the fuel flowing through said conduit under normal engine operating conditions, and second means operatively connected to said first means for controlling the percentage of fuel withdrawn thereby during acceleration of the engine including an electronic temperature control and amplifier for comparing an actual engine operating temperature with a desired reference temperature, an acceleration temperature reference circuit connected to said electronic control for establishing a variable temperature schedule during acceleration and means responsive to a variable engine operating condition operatively connected to said temperature reference circuit for varying the temperature reference as a function of said engine operating condition during acceleration of the engine.

2. In a fuel feed and power control system for a gas turbine engine having a compressor, a fuel conduit connected to deliver fuel under pressure to the engine, first means for withdrawing a substantially constant percentage of the fuel flowing through said conduit under normal engine operating conditions, and second means operatively connected to said first means for controlling the percentage of fuel withdrawn thereby during acceleration of the engine including electrical temperature control means, a turbine temperature reference circuit connected to the electrical control for establishing a variable turbine temperature reference during acceleration of the engine and means responsive to engine speed and a compressor air temperature operatively connected to said temperature reference circuit for varying the turbine temperature reference during acceleration.

3. In a fuel feed and power control system for a gas turbine engine, a fuel conduit connected to deliver fuel under pressure to the engine, valve means for withdrawing a substantially constant percentage of the fuel flowing through said conduit at any given position of said valve means, and means operatively connected to said valve means for controlling the position thereof including a turbine temperature reference circuit, a potentiometer in said circuit for referencing said valve means to a desired turbine temperature schedule during acceleration of the engine, and cam means responsive to engine speed for controlling the effective turbine temperature reference picked off at said potentiometer.

4. In a fuel feed and power control system for a gas turbine engine having a burner and a compressor and a turbine for driving the compressor, a fuel conduit connected to deliver fuel under pressure to the burner, main fuel control means in said conduit for scheduling a predetermined flow of fuel through said conduit under all conditions of engine operation, means in flow controlling relation with said main control means including a put-and-take valve for modifying said scheduled output of flow to the burner by withdrawing from said conduit a different constant percentage of said scheduled output for each different position of said valve, and means for controlling the position of said valve as a function of a preselected schedule of turbine temperature in such a manner that said valve will withdraw that percentage of the scheduled output of said main fuel control as is necessary to maintain said preselected schedule of turbine temperature, including acceleration turbine temperature scheduling means responsive to variations in engine speed for automatically selecting said schedule of turbine temperature during acceleration of the engine.

5. In a fuel feed and power control system for a gas turbine engine, a fuel conduit connected to deliver fuel under pressure to the engine, valve means for withdrawing a substantially constant percentage of the fuel flowing through said conduit at any given position thereof, and electrical means operatively connected to said valve means for controlling the position thereof including a first turbine temperature reference circuit for selecting a desired turbine temperature schedule during steady state operation of the engine, a second turbine temperature reference circuit responsive to changes in compressor inlet temperature for selecting a desired turbine temperature schedule during acceleration of the engine and means responsive to engine speed for switching from said second to said first circuit during operation of the engine.

6. In a fuel feed and power control system for an engine, conduit means connected to deliver fuel to the engine, first means for withdrawing from said conduit means a predetermined percentage of fuel over the operating range of the engine, second means operatively connected to said first means for controlling the percentage of fuel withdrawn thereby as a function of a first engine operating condition such as a reference temperature to which the engine is controlled during engine operation at constant speed, and third means responsive to variations in a second engine operating condition such as engine speed operatively connected to said first means for controlling the percentage of fuel withdrawn thereby as a function of said first engine operating condition during acceleration of the engine.

7. In a fuel feed and power control system for an engine, conduit means connected to deliver fuel to the engine, means for withdrawing from said conduit means a predetermined percentage of fuel during normal engine operation, and means responsive to variations in engine speed operatively connected to said latter means for varying the percentage of fuel withdrawn thereby, means responsive to an engine temperature operatively connected to said engine speed responsive means, said engine speed responsive means acting to vary the percentage of fuel withdrawn as a function of said engine temperature during acceleration of the engine.

8. In a fuel feed and power control system for a gas turbine engine having a compressor and a turbine drivably connected thereto, conduit means connected to deliver fuel to the engine, means for withdrawing from said conduit means a predetermined percentage of fuel during normal engine operation, and means responsive to variations in compressor inlet temperature operatively connected to said latter means for varying the percentage of fuel withdrawn thereby, turbine temperature responsive means operatively connected to said compressor inlet temperature responsive means, said compressor inlet temperature responsive means acting to vary the percentage of fuel withdrawn as a function of said turbine temperature during acceleration of the engine.

9. In a fuel feed and power control system for a gas turbine engine, a fuel conduit connected to deliver fuel under pressure to the engine, valve means for withdrawing a substantially constant percentage of the fuel flowing through said conduit at any given position thereof, and electrical means operatively connected to said valve means for controlling the position thereof including a first turbine temperature reference circuit for selecting a desired turbine temperature schedule during steady state operation of the engine, a second turbine temperature reference circuit responsive to changes in engine speed and compressor inlet air temperature for selecting a desired turbine temperature schedule during acceleration of the engine and means responsive to engine speed for switching from said second to said first circuit during operation of the engine.

References Cited in the file of this patent

UNITED STATES PATENTS

| | | |
|---|---|---|
| 2,478,909 | Flagle | Aug. 16, 1949 |
| 2,479,813 | Chamberlin et al. | Aug. 23, 1949 |
| 2,545,703 | Orr | Mar. 20, 1951 |
| 2,589,074 | Goodwin | Mar. 11, 1952 |
| 2,610,466 | Ballantyne et al. | Sept. 16, 1952 |
| 2,629,984 | Jamison et al. | Mar. 3, 1953 |
| 2,673,556 | Reggio | Mar. 30, 1954 |
| 2,762,194 | Kunz et al. | Sept. 11, 1956 |

UNITED STATES PATENT OFFICE
CERTIFICATE OF CORRECTION

Patent No. 2,867,084                                                  January 6, 1959

Daryl L. Criswell

It is hereby certified that error appears in the printed specification of the above numbered patent requiring correction and that the said Letters Patent should read as corrected below.

Column 6, line 1, for "1750° C." read -- 1750° F. --; line 72, for "sleve" read -- sleeve --; column 7, line 14, for "will by" read -- will be --.

Signed and sealed this 21st day of July 1959.

(SEAL)
Attest:

KARL H. AXLINE                                          ROBERT C. WATSON
Attesting Officer                                      Commissioner of Patents